Patented Aug. 26, 1952

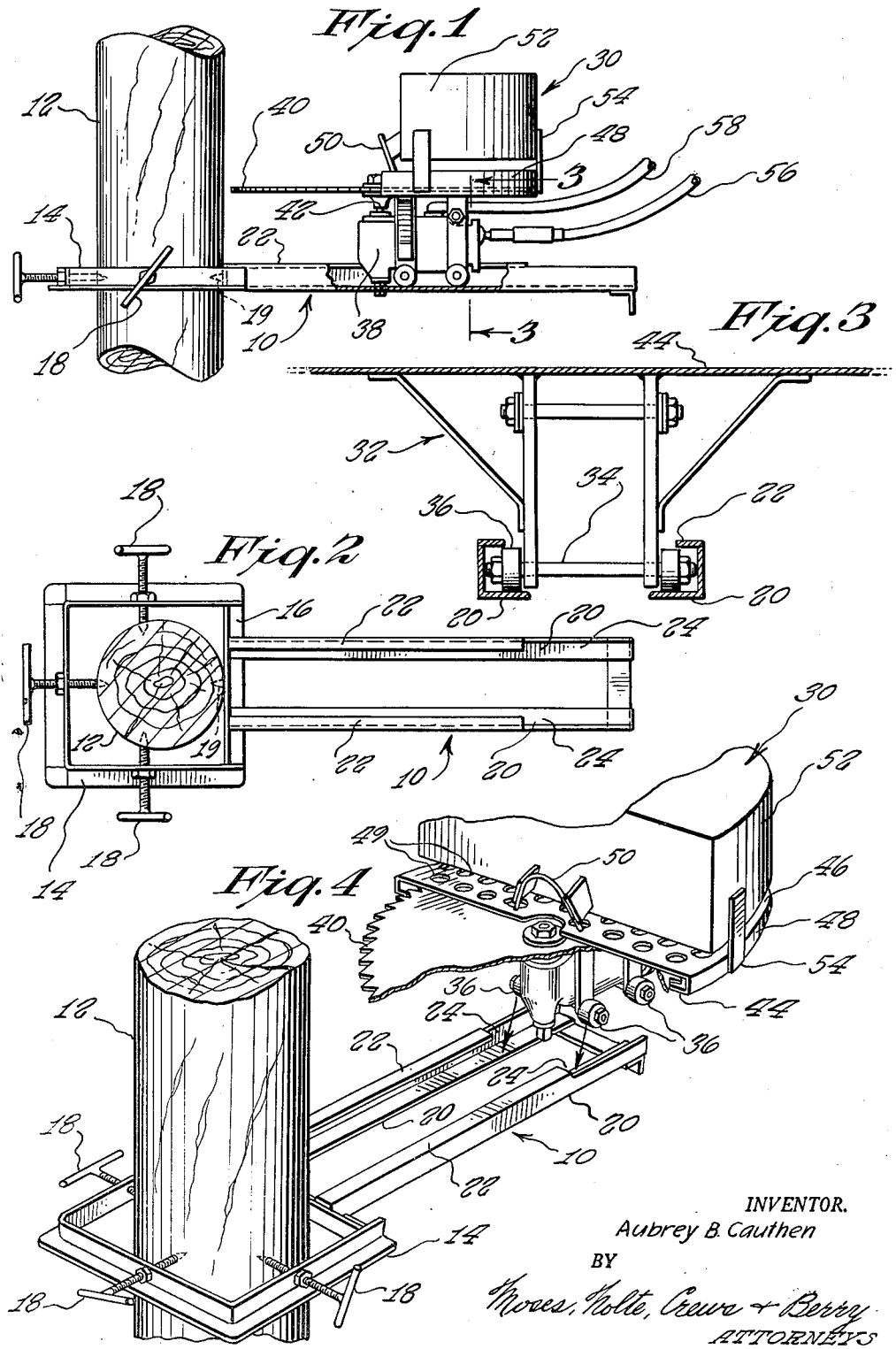

2,608,220

UNITED STATES PATENT OFFICE 2,608,220

POWER SAW FOR UNDERWATER WORK

Aubrey B. Cauthen, Charleston, S. C., assignor to Todd Shipyards Corporation, a corporation of New York Application February 11, 1949, Serial No. 75,873

3 Claims. (Cl. 143—34)

This invention relates to power saws for underwater work. The apparatus of the present invention is particularly applicable to the sawing of piles or other heavy timbers and is especially useful for the sawing off of pile stubs close to the bottom, although it may be utilized for other jobs where readily portable power sawing equipment is desired.

In the provision of power sawing equipment for underwater use, where the equipment must be handled by divers, it is particularly important to have an apparatus capable of being handled without extensive hoisting equipment and which can, if possible, be handled by a single diver. It is also very important to provide a power sawing equipment in which the saw is positively guided when being used. This is important from the safety point of view because the manipulation of a power driven saw under water, merely held and guided by one or more divers, is dangerous, as it may get out of control with resulting injury to the operators and possible cutting of the air hoses.

In accordance with the present invention, the apparatus includes two readily separable parts, one of which comprises a guide frame which can first be placed in position and secured to the pile or other timber to be cut, the other part comprising the saw and its motor which may be mounted upon the guide frame after the latter is in position. The saw and motor may be provided with a buoyancy tank to facilitate handling under water. The construction of the guide frame and of the parts of the power sawing unit which cooperate therewith is such that when the sawing unit has been brought into working position, it is positively supported by and retained on the guide frame.

The object of the invention is to provide a simple and easily handled and assembled apparatus meeting the conditions above indicated.

In the accompanying drawings which show a preferred embodiment of the invention:

Fig. 1 is a side elevation showing the apparatus attached to a section of piling;

Fig. 2 is a plan view of the apparatus shown in Fig. 1, the pile being shown in section;

Fig. 3 is a transverse vertical section on the line 3—3 of Fig. 1; and

Fig. 4 is a perspective diagrammatic view, showing how the power saw may be lowered into position upon the frame attached to the pile.

Referring to the drawings in detail, 10 is the guide frame which is shown as attached to a section of piling 12. The guide frame is shown as comprising a securing frame 14 big enough to receive any section of piling within the capacity of the apparatus. As shown, this frame is of rectangular shape and made of angle irons welded together, although it obviously may be of any other suitable construction and form. The front member 16 of the frame rests against the side of the pile and the frame is firmly clamped to the pile by clamping screws 18, three of which are shown, one being mounted in each of the other three sides of the frame. Preferably the front member 16 carries a pointed lug 19 which is forced into the pile. In this way, the frame may be firmly secured to piles of different diameters, the pile, however, being in each case forced against the front member 16 and lug 19 so as to be as close to the saw as possible. The front member 16 carries a pair of trolley rails 20 which project horizontally if the frame is attached to a vertical pile. The tracks are shown as comprising angle irons and flanges 22 are secured to the upright legs of said angle irons. These flanges extend part way out from the frame member 16 but not all the way, so as to leave open spaces 24 to permit the placing of the saw and motor carrying trolley on the tracks.

The power saw unit 30 comprises a trolley 32 mounted on axles 34 carrying rollers 36 which roll on the tracks 20. The trolley carries a motor 38 which may be of any suitable type, such as an air motor or a water-proof electric motor, a compressed air-operated motor being usually most convenient. Any suitable type of power saw capable of being driven by the motor may be utilized. Preferably a circular saw 40 is employed. This is mounted upon the vertical shaft 42 of the motor. A saw guard for the part of the saw away from the pile is preferably employed, such a saw guard comprising a bottom plate 44, a top plate 46, and a curved side wall 48. If desired, the plates may be perforated, as shown at 49. The saw guard is mounted on the trolley above the motor. One or more handles 50 are preferably provided on the saw guard to facilitate the handling of the apparatus. It is usually desirable to provide the power saw unit with a buoyancy tank or float 52 which may be secured above the saw guard by brackets 54.

If an air motor is utilized, air is supplied thereto through a hose 56, and an exhaust hose 58 to discharge the exhaust above the water level is also preferably provided. By discharging the exhaust above the water level, back pressure is reduced, thus permitting maximum power of the motor to be utilized.

In the use of the apparatus, the frame unit is first placed upon the pile being lowered into position with the aid of a simple hand tackle, if necessary. Ordinarily, the frame can be positioned by a single diver. The power sawing unit is then lowered into position adjacent to the outer ends of the trolley tracks, whereupon the diver can readily fit the rollers to the tracks and advance the unit so that the rollers are held in position by the flanges 22. The power sawing unit is now in a secure position where it may be rolled in along the tracks as the sawing proceeds but from which it cannot escape to a free position where it might injure the diver or cut the hoses. All the diver has to do now is to turn on the power and push the trolley forward along the tracks while the saw cuts the pile.

While I have illustrated and described in detail certain preferred forms of my invention, it is to be understood that changes may be made therein and the invention embodied in other structures. I do not, therefore, desire to limit myself to the specific construction illustrated, but intend to cover my invention broadly in whatever form its principle may be embodied.

I claim:

1. In a power sawing apparatus for underwater work, a frame adapted to encircle a pile or other object to be sawed, said frame having clamping means engaging the pile for firmly attaching the frame in fixed position thereon, a track projecting laterally from the frame, said frame and track being wholly supported on the pile to be sawed, said track comprising rails having retaining flanges extending throughout a part of the length of the rails, a portion of the track being left uncovered by the retaining flanges, a trolley mounted on the track having rollers adapted to be placed upon the part of the track uncovered by the retaining flanges and moved under the retaining flanges so that the trolley is retained on the track by the flanges and may be advanced therealong, and a saw and motor for driving the same carried by said trolley.

2. A power sawing apparatus for underwater work, comprising two self-contained separable units each being of such size and weight that they may be handled and placed in position by a single diver, one of said units comprising a frame adapted to be lowered over a pile or other object to be sawed and having a portion encircling the pile, clamping means for engagement with the pile by which the frame may be affixed to and wholly supported by said pile, and track rails fixed to and projecting laterally from said frame and wholly supported thereby, said track rails having retaining flanges extending throughout a part of the length of the rails, a portion of the track being left uncovered by the retaining flanges, the second unit being a power saw unit comprising a saw and a motor for driving the same and a trolley on which said saw and motor are mounted, said trolley having rollers adapted to be placed on the part of the track uncovered by the retaining flanges and moved under the retaining flanges so that the trolley is retained on the track by said flanges and may be advanced along it to bring the saw into sawing engagement with the object to be sawed, said second unit having a saw guard and a buoyancy float rigidly affixed thereto.

3. A power saw unit for under water work, comprising a trolley having rollers thereon, a motor mounted on said trolley and having a short vertical shaft located at one end of the trolley and projecting above the motor, a substantially semicircular saw guard carried by the trolley in horizontal position above the motor, a saw mounted upon the motor shaft and partly enclosed by said saw guard, and a substantially semicircular buoyancy float mounted on top of said saw guard.

AUBREY B. CAUTHEN.

REFERENCES CITED

The following references are of record in the file of this patent:

UNITED STATES PATENTS

| Number | Name | Date |
|---|---|---|
| 864,453 | Day | Aug. 27, 1907 |
| 971,600 | Freese | Oct. 4, 1910 |
| 1,215,822 | Leu | Feb. 13, 1917 |
| 1,378,259 | Meaker et al. | May 17, 1921 |
| 1,413,310 | Wunsch | Apr. 18, 1922 |
| 1,538,745 | Reimann | May 19, 1925 |
| 1,556,061 | Ball | Oct. 6, 1925 |
| 1,766,323 | Bennett | June 24, 1930 |
| 1,923,853 | Van Duyn | Aug. 22, 1933 |
| 1,946,390 | Christiansen | Feb. 6, 1934 |
| 2,273,160 | Tuck | Feb. 17, 1942 |

FOREIGN PATENTS

| Number | Country | Date |
|---|---|---|
| 6,701 | Great Britain | June 2, 1885 |